United States Patent
Ravid et al.

(10) Patent No.: US 10,309,082 B2
(45) Date of Patent: Jun. 4, 2019

(54) FLUID FLOW MONITORING, VERIFICATION AND CONTROL SYSTEM AND METHOD

(71) Applicant: WINT-WI LTD., Hod Hasharon (IL)

(72) Inventors: Shay Ravid, Hod Hasharon (IL); Alon Gal, Hod Hasharon (IL); Lior Hertz, Hod Hasharon (IL)

(73) Assignee: WINT-WI LTD., Hod Hasharon (IL)

( * ) Notice: Subject to any disclaimer, the term of this patent is extended or adjusted under 35 U.S.C. 154(b) by 0 days.

(21) Appl. No.: 15/124,896

(22) PCT Filed: Mar. 8, 2015

(86) PCT No.: PCT/IL2015/050240
§ 371 (c)(1),
(2) Date: Sep. 9, 2016

(87) PCT Pub. No.: WO2015/136522
PCT Pub. Date: Sep. 17, 2015

(65) Prior Publication Data
US 2017/0016214 A1    Jan. 19, 2017

(30) Foreign Application Priority Data

Mar. 12, 2014  (IL) .......................................... 231464

(51) Int. Cl.
*F16K 31/122*  (2006.01)
*E03B 7/07*  (2006.01)
(Continued)

(52) U.S. Cl.
CPC .............. *E03B 7/071* (2013.01); *F16K 1/126* (2013.01); *F16K 31/1221* (2013.01); *F16K 31/1223* (2013.01); *F17D 3/01* (2013.01); *F17D 5/02* (2013.01); *G01M 3/2807* (2013.01); *F02C 9/46* (2013.01); *Y02A 20/15* (2018.01)

(58) Field of Classification Search
CPC .. F16K 31/1221; F16K 31/1223; E03B 7/071; G01M 3/2807; Y10T 137/7723; Y10T 137/7725; Y10T 137/7728; Y10T 137/7761; Y10T 137/86397
See application file for complete search history.

(56) References Cited

U.S. PATENT DOCUMENTS 3,880,178 A * 4/1975 Panissidi ................. F15B 21/02
                                                      137/14
5,038,820 A * 8/1991 Ames ....................... F16K 31/02
                                                      137/460
(Continued)

FOREIGN PATENT DOCUMENTS

DE        29923051       4/2000
DE       102009045150    6/2011

OTHER PUBLICATIONS

International Search Report and Written Opinion issued in a corresponding application PCT/IL2015/050240 dated Jun. 15, 2015.

*Primary Examiner* — Matthew W Jellett
(74) *Attorney, Agent, or Firm* — Dorsey & Whitney LLP

(57) ABSTRACT

A fluid flow system comprising a supply line, a fluid control unit and at least one end user; wherein fluid flow through the system is facilitated only upon a certified verification signal generated by the end-user and certifying said verification signal by the fluid control unit.

12 Claims, 4 Drawing Sheets

(51) Int. Cl.
*F17D 3/01* (2006.01)
*F17D 5/02* (2006.01)
*G01M 3/28* (2006.01)
*F16K 1/12* (2006.01)
*F02C 9/46* (2006.01)

(56) References Cited

U.S. PATENT DOCUMENTS

| | | | |
|---|---|---|---|
| 5,503,175 A * | 4/1996 | Ravilious | E03B 7/071 137/1 |
| 6,237,618 B1 * | 5/2001 | Kushner | E03B 7/071 137/1 |
| 6,317,051 B1 | 11/2001 | Cohen | |
| 6,556,142 B2 * | 4/2003 | Dunstan | H04L 12/2803 340/602 |
| 8,720,481 B2 * | 5/2014 | Guy | E03B 7/071 137/486 |
| 2004/0155784 A1 | 8/2004 | Candela | |
| 2007/0289635 A1 | 12/2007 | Ghazarian et al. | |
| 2008/0185052 A1 * | 8/2008 | Loper | F15B 13/023 137/517 |
| 2009/0194719 A1 | 8/2009 | Mulligan | |
| 2010/0307600 A1 * | 12/2010 | Crucs | E03B 7/071 137/2 |
| 2010/0313958 A1 | 12/2010 | Patel et al. | |
| 2011/0114202 A1 * | 5/2011 | Goseco | E03B 7/04 137/487.5 |
| 2014/0183386 A1 | 7/2014 | Ravid et al. | |
| 2017/0016214 A1 | 1/2017 | Ravid et al. | |

* cited by examiner

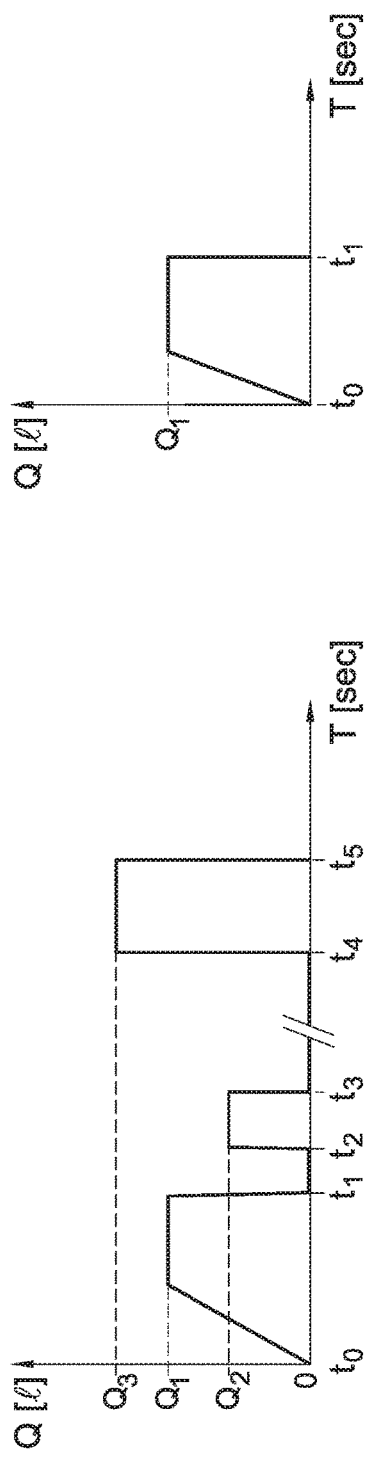
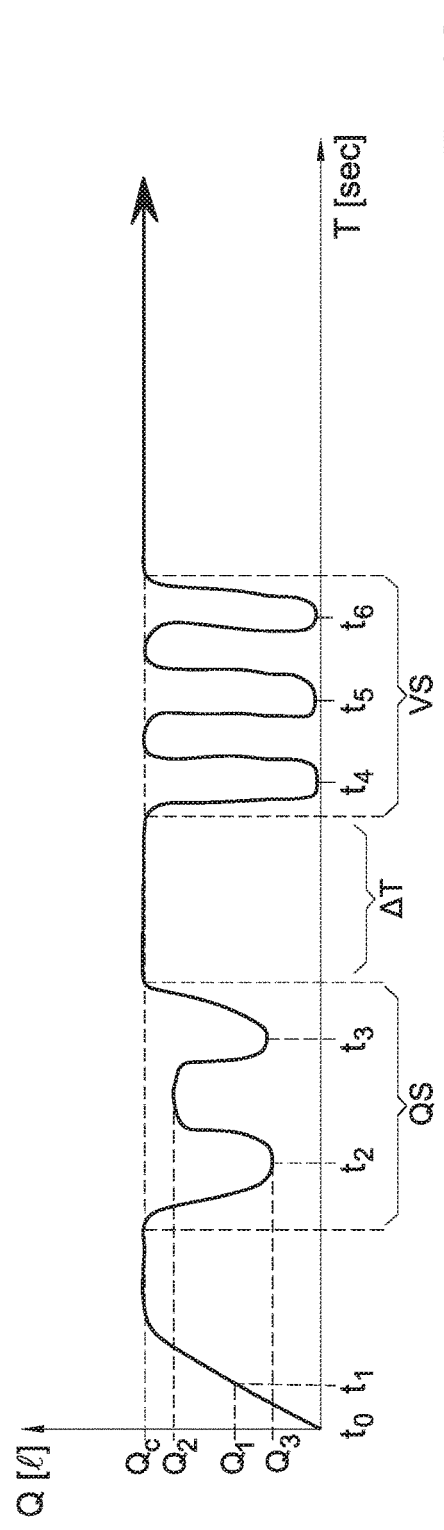

FLUID FLOW MONITORING, VERIFICATION AND CONTROL SYSTEM AND METHOD

CROSS-REFERENCE TO RELATED APPLICATIONS

The present application is a U.S. National Phase of PCT/IL2015/050240 filed on Mar. 8, 2015 claiming priority to Israeli application No. 231464 filed Mar. 14, 2014; the disclosure of the PCT Application is hereby incorporated by reference into the present Application.

TECHNOLOGICAL FIELD

The present disclosed subject matter is directed at a system and method configured for communicating through a fluid supply system. More particularly the disclosure is concerned with generating recognizable signaling between a fluid control unit and an end user.

Acknowledgement of the above references herein is not to be inferred as meaning that these are in any way relevant to the patentability of the presently disclosed subject matter.

BACKGROUND

Fluid flow systems, such as urban or domestic water supply systems, gas supply systems in a plant, etc., may require authentication of an end-user in order to confirm fluid consumption through the respective system, by the a particular end-user, and to verify that consumption by the end-user is intentional and recognizable by a fluid control unit of the fluid flow system.

The term end-user as used herein in the specification and claims denotes any fluid consuming device fitted at a fluid flow system. For example, an end-user can be an open ended hose (fitted or not with a nozzle/spout), an irrigation unit or irrigation line, a water supply unit such as a toilet, shower, sink and the like, etc.

The term deterministic end-user as used herein in the specification and claims denotes an end-user configured for consumption of a predetermined amount of fluid. Alternatively, this term can be used for designating an end-user configured for consuming fluid at predetermined times or intervals. Examples of deterministic end-users are a dishwasher, a laundry machine and the like, a controlled/computerized irrigation line, etc.

GENERAL DESCRIPTION

According to the present disclosure there is provided a fluid flow system comprising a supply line, a fluid control unit and at least one end user; wherein fluid flow through the system is facilitated only upon a certified verification signal generated by the end-user and certifying said verification signal by the fluid control unit.

The term fluid control unit as used herein in the specification and claims denotes a controller configured for associated with a fluid system comprising a supply line being in flow communication with a fluid supply source and configured for supplying fluid to one or more end-users, said controller configured for recognizing/monitoring fluid flow and/or consumption through the fluid system. The fluid control unit can be useful in determining whether fluid flow is deliberate (i.e. intended) or not.

According to one particular embodiment, the verification signal is generated responsive to a query signal generated by the fluid control unit.

At the absence of a certified verification signal, the fluid control unit is configured for generating a shutoff signal to a valve articulated with the fluid flow system, to thereby terminate fluid flow to the end-user. Accordingly, if a certified verification signal is generated by the end-user, the valve will remain open.

According to another aspect of the present disclosure there is provided a fluid control unit for use in conjunction with a fluid flow system, said fluid control unit configured for facilitating fluid flow through an end-user of the system only upon receiving a certified verification signal generated by the end-user. Fluid flow is facilitated through a valve controlled by the fluid control unit.

According to one particular embodiment, the fluid control unit is configured for generating a query signal and upon receiving a verification signal generated responsive to said query signal, the fluid control unit will facilitate fluid flow through the fluid flow system.

According to yet an aspect of the present disclosure there is provided a signaling method between a fluid control unit and an end-user.

A signaling method can comprise the following steps:

Providing a fluid flow system comprising a supply line coupleable to a main fluid supply line, a fluid control unit, a flow valve governed by the fluid control unit, and at least one end-user;

Consuming fluid through the at least one end-user, with the flow valve at an open position thereof;

Generating a verification signal by said at least one end-user;

Transferring said verification signal to the fluid control unit; and

Certifying the verification signal by the fluid control unit and determining whether to maintain the valve open.

The verification signal can be generated before or during fluid consumption.

According to an embodiment of the disclosed method, the verification signal is generated responsive to a query signal generated by the fluid control unit.

According to even yet an aspect of the present disclosure there is provided a signaling system between a fluid control unit and an end-user.

By one other aspect of the present disclosure there is provided a device configured for generating a verification signal, for use in conjunction with a fluid supply system according to the disclosure.

Any one or more of the following features, designs and configurations can be associated with a fluid flow system and/or a fluid control unit and the method according to the present disclosure, independent or in different combinations:

The communicating signals between the end-user and the fluid control unit can be symmetric, i.e. the query signal and the verification signal can be of the same nature. Namely, the query signal and the verification signal can be identical to one another or be of the same nature but however have a different signal pattern;

A signal in direction from the fluid control unit to end-user is referred to as an outgoing signal, or a query signal;

A signal in direction from the end-user to the fluid control unit is referred to as an incoming signal, or a verification signal;

A first one of the query signal and the verification signal can be generated upon fluid consumption through the fluid flow system;

The verification signal can be generated responsive to a query signal generated by the fluid control unit;

The verification signal can be generated spontaneously by the end-user, namely without a query signal generated by the fluid control unit;

At the absence of a verification signal, either responsive to a query signal generated by the fluid control unit or as a first signal generated by the end-user upon consuming fluid, the fluid control unit can generate one or more reminder query signals, whereby at the event of failure to generate a responsive verification signal, the fluid control unit can generate a control signal to close a flow valve associated with the respective non-responding end-user;

Either one or both of the query signal and the verification signal can be for example a recognizable sequence of flow pulsations through the fluid;

Either one or both of the query signal and the verification signal can be for example a recognizable acoustic signal over a piping of the fluid flow system;

Either one or both of the query signal and the verification signal can be for example a recognizable acoustic signal generated by a signal generator configured for generating a query signal or a verification signal, and transmitting the signal, through wire or wireless communication, to a receiver configured at the either or both the end-user and the fluid control unit, respectively;

The signal generator can be an external acoustic generator, stationary or portable, configured for generating a sequence of acoustic pulses such as knocks, tunes, etc.;

The verification signal can be generated by a flow-altering unit mounted on the supply line in association with the end-user and configured for temporarily altering fluid flow pattern through the line in compliance with a predetermined signal. For example, the altering fluid flow pattern can be decreasing the flow rate through the line and gradually increasing, however at a predefined pattern, such as step function, sinusoidal functions, etc.;

The flow-altering unit can be an autonomous device (e.g. a mechanical flow governing unit) or cooperating in conjunction with a controller element;

The verification signal can be generated by an individual cooperating with an end-user (e.g. while opening a tap, taking a shower, watering the garden, etc.), wherein the verification signal can be for example a sequence of several rapidly repeated closing/opening the faucet. This would signal to the fluid control unit that the end-user is 'under control', namely that fluid (water in the particular example) is intentionally consumed by the individual, and that it is not an unintentional fluid consumption such as pipe burst' and the like;

The control unit can be configured for determining whether fluid flow through the fluid system is authorized or occurs unwillingly, e.g. as a result of a leak in piping, failure/error/malfunctioning of an end-user, system unintentionally opened or unintentionally left at an open state, etc.;

Generating the verification signal can be performed automatically or manually;

The verification signal can be generated within the system or externally;

The control unit can be configured with a user interface for setting it at different operative positions;

The control unit can be configured with a clock and calendar;

A verification signal generator, according to a particular configuration, can comprise a housing fitted with an inlet port and an outlet port with a fluid chamber in-between said inlet port and outlet port, a flow regulator configured to facilitate fluid flow into the fluid chamber at a substantially constant flow rate, and a flow restriction device configured to facilitate flow through the verification signal generator only upon pressure buildup within the fluid chamber to a predetermined value;

The verification signal generator can be configured such that the flow regulator is replaceable to obtain different flow rates into the fluid chamber;

The verification signal generator can be configured such that the pressure threshold required to open the flow restriction device is controllable.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 2A to 2F are different examples of signaling schemes between a fluid control unit and end-users, useful in the example of FIG. 1.

DETAILED DESCRIPTION OF EMBODIMENTS

Figure 1:
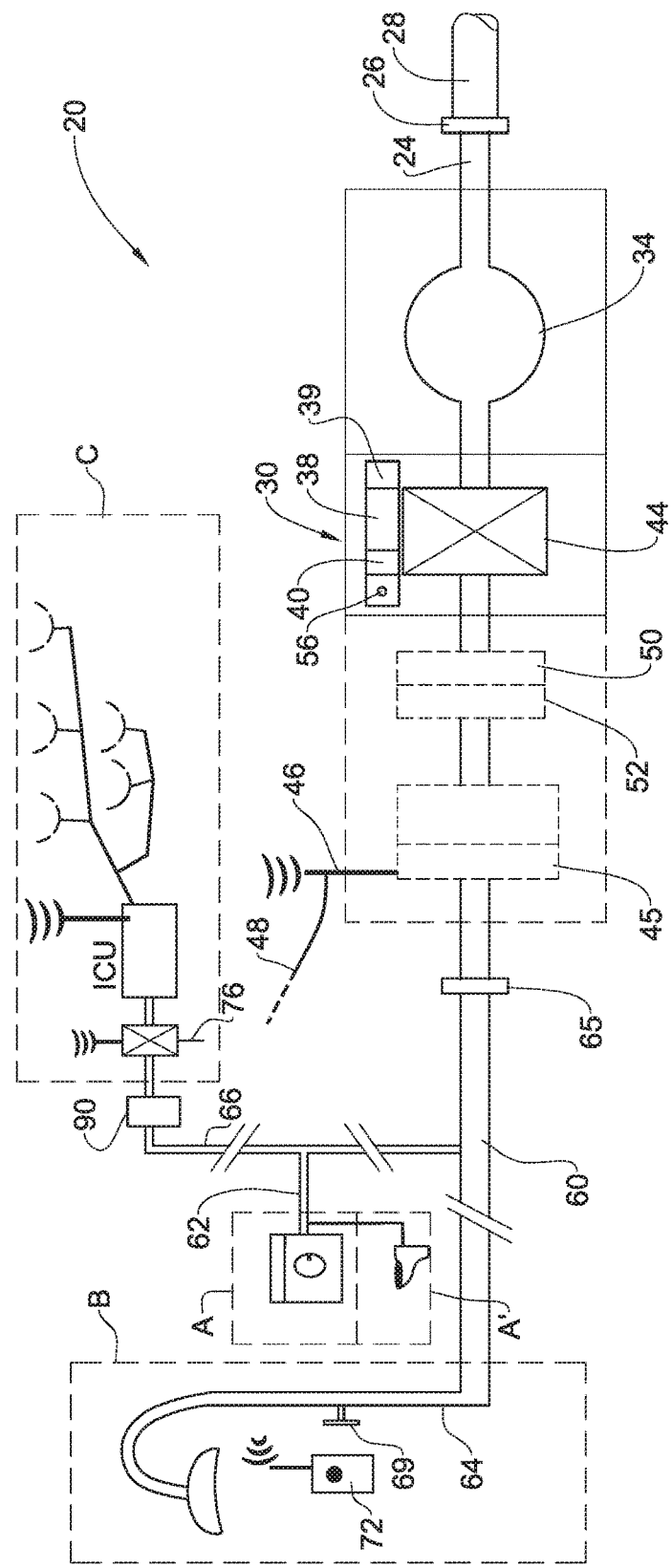
FIG. 1 is a schematic representation of a fluid flow system according to an example of the present disclosure, associated with a domestic water supply system.

Attention is first directed to FIG. 1 of the drawings schematically illustrating a fluid system generally designated 20, representing a domestic water supply system. The fluid system 20 comprises an inlet supply line 24 coupleable through coupler device 26 to a mains upstream supply line 28. A fluid control assembly generally designated 30 is fitted on the supply line 24 and comprises a metering unit 34, a control unit 38 associated with a power source 40 and a valve 44 which in the present example is an electrically operated valve controlled by the control unit 38.

The control unit 38 is associated with a flow/pressure sensor associated with the control unit 38, as will be explained herein below.

The valve can be open/closed (i.e. an on/off) type valve, or a valve configurable between gradually closed/open positions. The valve can be a hydraulic valve, a pneumatic valve, etc.

According to one example, the fluid control assembly can further be configured with a communication unit 45 with a transceiver module 46 i.e. a wireless communication module with an antenna, and/or a wired communication port 48. The purpose of the communication unit 45 and how it can serve with s system according to the present disclosure will become apparent hereinafter.

The fluid control assembly 30 can further be configured with a variety of fluid/liquid flow governing devices, integral with or articulated with the system. Such governing devices can be for example a UFR (Unmeasured Flow Reducer) device 50, a backflow preventer 52, and the like. The fluid control assembly 30 can be a block unit or it can be configured with a main block unit and one or more attachable modules.

In addition, the fluid control assembly 30 can be configured with an alerting module 56 for informing a control center, an individual and the like regarding the situation of the system. The alerting module can be for example a cellular communication module and the like, wherein pre-programmed messages can be transmitted, indicative of the status and functioning of the fluid system 20.

Reverting to the control unit 38, it is a decision-making system configured for deciding whether fluid flow downstream within the fluid system is a planed event, namely the result of willful consumption by an individual or as a result of controlled consumption however approved and determined Thus, the control unit 38 is configured for preventing unintentional fluid consumption through by an end user of the fluid system. This is performed by closing a valve associated with the control unit 38. The decision-making of the control unit can be based on pre-programmed parameters and/or on acquired parameters upon use of the system.

A branching supply line 60 is coupled to the fluid control assembly 30 through coupler 65, and downstream splits into three sub-supply lines, namely:

a first sub-supply line 62 extending towards a first end-user, namely a washing machine designated A, a toilet with a cistern designated A', representative of a so-called deterministic end-user, as will be explained hereinafter;

a second sub-supply line 64 extending towards a second end-user, namely a shower unit designated B; and a third sub-supply line 66 extending towards a third end-user, namely an irrigation setup designated C, fitted with an irrigation control unit (ICU) as will be referred to hereinafter with further detail.

Further reference is made to the first end-user A representing a so-called deterministic end-user, namely a domestic appliance (washing machine in the particular example) programmed to operate with a known water consumption scheme (i.e. fixed amount of water consumed at regular and predictable flow rates and intervals). Thus, it is unlikely that such an appliance will excite the control unit to generate a query signal (as will be explained herein below).

The flow consumption scheme for the deterministic end-user A (washing machine) is schematically represented in FIG. 2A:

$t_0$ to $t_1$—initial filling the washing machine drum with water; Consuming at $Q_1$ rate;

$t_1$ to $t_2$—begin washing process;

$t_2$ to $t_3$—adding water to the drum; Consuming at $Q_2$ rate;

$t_3$ to $t_4$—completing washing process, draining washing water;

$t_1$ to $t_5$—filing fresh water into the drum for rinsing; Consuming at $Q_3$ rate.

Such a scheme can be recognized or preloaded or programmed into the control unit 38, so as not to excite the control unit to generate a query signal. Otherwise, such a scheme can be recognized as a verification signal (see hereinafter with reference to FIG. 2F)

The toile cistern designated A' is also representative of a so-called deterministic end-user, as it is appreciated that though a toilet cistern may be operated during night hours; however flushing the toilet is a deterministic event, namely requiring a preset amount of water and also lasts for a substantially short duration). Thus, in this case too, it is unlikely that flushing the toilet will excite the control unit to generate a query signal.

FIG. 2B schematically illustrates a flow scheme for such an event (toilet flushing), where water is consumed at a single instance, at a constant flow rate $Q_1$ for a short duration $t_0$ to $t_1$. In this case the control unit will not generate a query signal, despite occurrence at an unusual time of the day.

Turning now to the second example directed to end-user B, representative of a man-operative faucet such as a shower/bath tap, garden hose and the like. It is appreciate that under normal operative conditions such end-users are typically not operated during certain hours of the day (e.g. not at the wee hours of the night), and further that water consumption through such faucets is typically of irregular scheme.

If such consumption takes place during 'normal' household hours, the control unit 38 interprets it as an approved event and will not generate a query signal (see below). Though, under certain circumstances a query signal may be generated, when the control unit 38 is set to 'away' mode, indicating that water consumption (apart for example irrigation, as will be discussed herein below) is not approved and the valve 44 should be closed.

However, at the event of someone consuming water at an unexpected time or irregular time for that household (e.g. taking a shower or watering the garden in the middle of the night), the control unit 38 will be excited in order to determine that water consumption is not a result of a pipe burst or other fault.

With further reference being made to FIG. 2C, once the control unit 38 is at its operative mode and at the event of water consumption Q taking place at an unexpected time of the day, the control unit is excited at $t_1$ and a query signal QS is generated in the form of repeated flow fluctuations (in the present example two rapid fluctuations at $t_2$ and $t_3$, almost shut down at water flow $Q_2$-$Q_3$) for significantly short durations, almost like a pulse through the water, however sufficient for sensing by the individual taking a shower or otherwise using water.

Once the query signal QS is generated, the control unit 38 anticipates receipt of reply, namely a verification signal VS to be generated by the individual within a time frame $\Delta T$. The verification signal VS is generated by the individual by three rapid consecutive closing of the tap 69, taking place at $t_4$, $t_5$ and $t_6$. By doing so, a flow/pressure sensor 39 associated with the control unit 38 senses the flow fluctuations willingly generated by the user, whereby said fluctuations are recognized by the control unit as a verification signal VS and is certified so that further water consumption at desired flow rate Q can be un-interruptedly consumed.

Figure 2D:
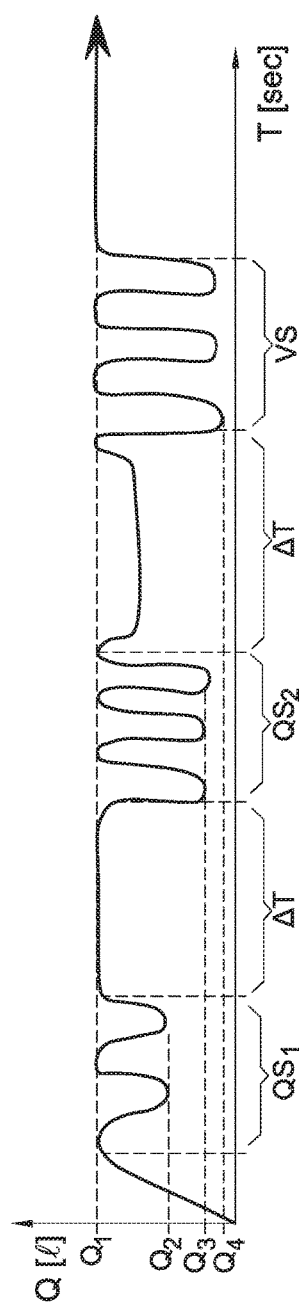

Attention is directed to FIG. 2D. If the individual fail to reply to the initial query signal $QS_1$ (of moderate intensity extending between flow rates $Q_1$-$Q_2$), namely timely generate a verification signal VS within the prescribed time frame $\Delta T$, the control unit 38 can be configured for repeating the verification procedure by repeating the query signal $QS_2$, identical to the previous sequence or intensified as in the present example (flow rate extending between flow rates $Q_1$-$Q_3$ and more distinct), in order to attract attention of the individual. The individual in turn generates a verification signal VS within the prescribed time frame $\Delta T$, so that further water consumption at desired flow rate can be un-interruptedly consumed. At the event of failure to generate a certified verification signal VS, the control unit 38 will generate a signal to close the valve 44 (assuming consumption is the result of a fault, e.g. a pipe burst and the like).

Figure 2E:
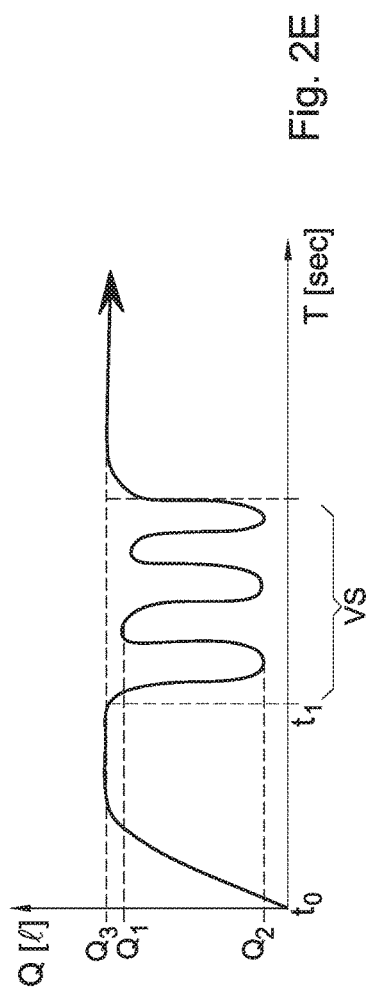

FIG. 2E is representative of a different scenario, wherein a user opens a tap 69 (or other water consuming end-user device) and spontaneously generates a predetermined verification signal VS in the form of a sequence of consecutive opening/closing of the tap 69, resulting in flow fluctuations between Q1-Q2. As long as the verification signal VS is generated within a predetermined period $t_1$ from the time the tap was opened at $t_0$, the verification signal VS is certified by the control unit 38 so that further water consumption at desired flow rate $Q_3$ can be un-interruptedly consumed.

Alternative to generating a verification signal VS by pulsating through the running water as explained hereinabove, a verification signal can be generated by a signal inducer 72 in the form of recognizable signal generator. Signal inducer 72 can be a push-button device transmitting a digital code, an audio string, etc,. Once activated by an individual, a verification signal recognizable by the control unit 38 is received by communication unit 45 (either wireless through the transceiver module 46 or through wired communication port 48). The signal inducer 72 can be a stationary device associated with a particular end-user (e.g. shower B, garden hose, swimming pool filling valve, etc.), or it can be portable and carryable by an individual.

According to one particular example, the signal inducer 72 can be configured for generating a sequence of acoustic pulses such as knocks, which when applied over a sound conducting media (e.g. branching supply line 60), the knocks are picked up by the control unit 38 and are identified as a certified verification signal.

FIG. 2E is representative of a different verification signal system, referred to with particular reference to the third sub-supply line 66 extending towards the irrigation setup designated C. The irrigation setup is fitted with an irrigation control unit (ICU) programmed for irrigation of different zones or configured for remote control activation, and a valve 76 remote controlled by the control unit 38.

Figure 2F:
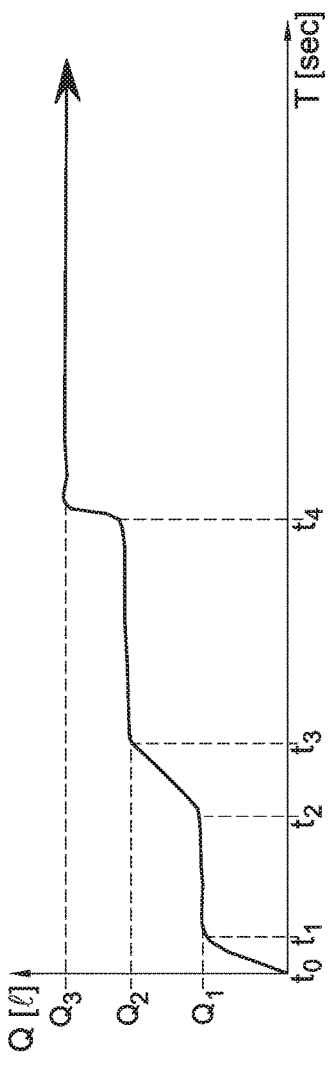

In order to verify an irrigation process, namely to prevent shut down of water supply to the irrigation sub-supply line 66 (by remote closing of the valve 76), a verification signal is anticipated by the control init 38. As explained herein above, the verification signal VS can be generated responsive to a query signal QS or spontaneously. In the present example, the irrigation control unit (ICU) is configured for generating a verification signal VS in the form of a distinguished flow pattern as illustrated in FIG. 2F. In the example it is noted that water flow gradually increases along predetermined time intervals with the following pattern:

Within $t_1$ from start at to flow reaches a flow rate $Q_1$

Within a time interval $t_3$ from $t_2$ flow gradually reaches a flow rate $Q_2$ and at time $t_4$ water flow increases rapidly to flow rate $Q_3$, this being the final flow rate for unlimited or uninterrupted consumption.

The control unit 38 recognizes this flow pattern as a certified verification signal VS and will retain the valve 76 (and valve 44) at their open position.

Figure 3A:
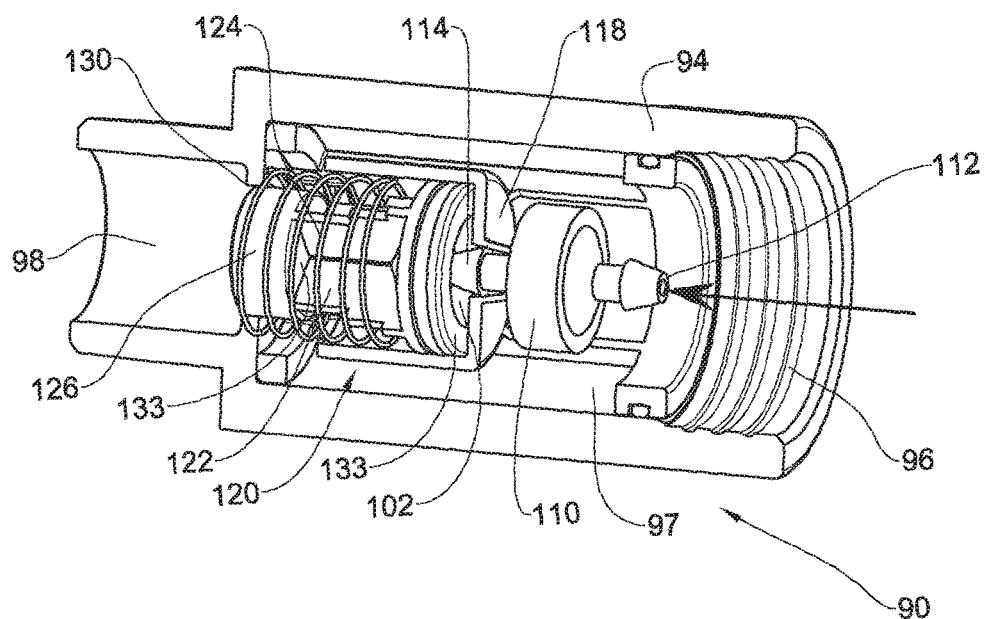
FIG. 3A is an example of a verification signal generator for use in conjunction with a fluid flow system according to the present disclosure, the verification signal generator illustrated at a closed position thereof.
Figure 3B:
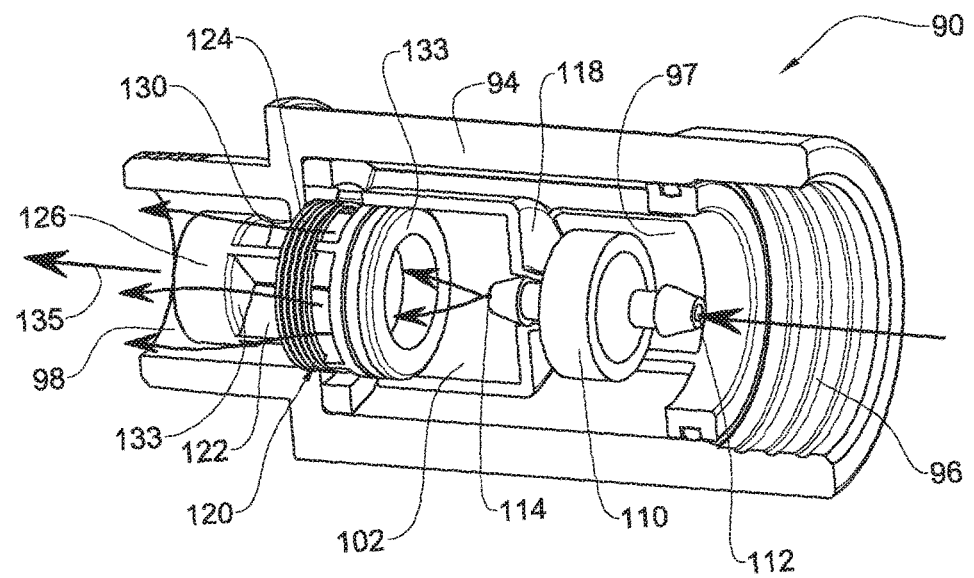
FIG. 3B illustrates the verification signal generator of FIG. 3A at an open position thereof.

Further attention is now directed to FIGS. 3A and 3B of the drawings, directed to a verification signal generator generally designated 90. The verification signal generator is a self maintained, automatic (i.e. autonomous) verification signal generator, which can be used in conjunction with the system disclosed herein above. In particular, a verification signal generator of the prescribed type can be associated with an end-user which typically does not require man operation, such as an irrigation system, a fountain and the like. The verification signal generator 90 is configured for coupling on a supply line providing fluid to the respective end-user. With reference to FIG. 1 of the drawings, the verification signal generator 90 can be fitted at any of the pipe supply or sub-supply segments (60, 62, 64, and 66)

The verification signal generator 90 comprises a housing 94 with an inlet port 96 extending into an inlet chamber 97 and coupleable (e.g. by a screw coupler) to an upstream fluid supply pipe segment, and an outlet port 98 coupleable to an upstream fluid supply pipe segment (i.e. extending towards the respective end user). The housing 94 is further configured with a fluid chamber 102 disposed between the inlet port 96 and the outlet port 98, and a flow regulator 110 which in turn is configured with an inlet opening 112 disposed at the inlet port 96, and an outlet opening 114 extending into the fluid chamber 102. The arrangement is such that fluid flow between the inlet port 96 and the fluid chamber 102 is facilitated only through the flow regulator 110, that owing to a barrier wall 118 disposed between the fluid chamber 102 and the inlet chamber 97.

The flow regulator 110 is an element configured to facilitate fluid flow therethrough at substantially constant flow rate ($\Delta Q/\Delta T$=constant). Such a device can be similar to an irrigation dripper, i.e. with a labyrinth or other forced flow element, and configured for emitting fluid therethrough at substantially constant flow rates (and substantially regardless of pressure differences).

A normally closed/sealed flow restriction device 120 in the form of a sealing plunger 122 is axially displaceable within the housing 94 between a closed/sealed position (FIG. 3A), and an open position (FIG. 3B). At the closed position the plunger 122 is biased by coiled spring 124 such that a tubular sealing portion 126 of the plunger 122 is sealingly received within a corresponding annular shoulder 130 of the housing 94, sealing the passage between the flow chamber 102 and the outlet port 98. At the open position, the coiled compression spring 124 surrenders and compress (FIG. 3B) so as to facilitate axial displacement of the plunger 122 in direction of arrow 135, whereby the tubular sealing portion 126 of the plunger 122 disengages from sealing engagement with the annular shoulder 130 of the housing 94, facilitating fluid flow as indicated by the arrowed lines.

The arrangement is such that when the device 90 is fitted on a supply line and associated with an end user (for example, an irrigation system C), water will flow through the third sub-supply line 66 into the normally closed verification signal generator 90 via inlet port 96, into the flow regulator 110 where only a small amount of initial water flows therethrough, until the fluid chamber fills up (time segment $t_2$-$t_4$ in diagram of FIG. 2F), during which period water flows at low though constant flow rate $Q_1$ and $Q_2$ until sufficient pressure buildup at the flow chamber 102, whereupon the force over the surface area 133 of the plunger 122 overcomes the biasing force of the spring 124, resulting in displacement of the plunger 122 into its open position (FIG. 3B), facilitating flow at high flow rate $Q_3$ therethrough (segment $t_4$ in FIG. 2F).

Thus, the control unit 38 receives a spontaneous (i.e. autonomously_ generated verification signal in the form of a predefined flow fluctuation pattern through the system, thereby certifying further fluid flow through the system.

The arrangement is such that a unique verification signal generator can be associated with one or more end users, each such device being configured for generating a characterizing flow fluctuation pattern signal representative of the associated end-user, for the control unit to associate and determine flow therethrough, respectively.

The verification signal generator can be configured such that the flow regulator 110 is readily replaceable to obtain different flow rates into the fluid chamber, to facilitate association with different end-users. In addition or instead, the verification signal generator can be configured such that the pressure threshold required to open the flow restriction device is controllable, e.g. by replacing or manipulating the compression spring, by replacing the shape of the plunger, etc.

It is appreciated that one or more valves can be configured throughout a fluid supply system, individually or commonly governed by the control unit, whereby water supply to different zones can be closed, however without interfering with proper operation of other zones.

Whilst in the illustrated example reference is made to a domestic water supply system, it is to be appreciated that the present disclosure can be applicable for any fluid supply system, whether a liquid or a gas supply system, as well as at any scale and purpose, i.e. domestic, urban planet/facility, etc, and however all fall within the scope of the present disclosure.

The invention claimed is:

1. A fluid flow system, comprising:
   a supply line;
   a flow valve;
   at least one end user; and
   a fluid control unit configured for governing the flow valve for facilitating fluid flow therethrough to the at least one end user, wherein governing the flow valve comprises opening the flow valve, maintaining the flow valve in the open position, and shutting the flow valve off,
   wherein upon initiation of the fluid flow through the fluid flow system, the fluid control unit maintains the flow valve in the open position only when a verification signal is generated and said verification signal is certified by the fluid control unit, wherein the verification signal is at least one of the following:
      a recognizable acoustic signal over a piping of the fluid flow system;
      a recognizable acoustic signal generated by a signal inducer configured for generating a respective signal, and transmitting the recognizable acoustic signal, through a communication arrangement, to a receiver configured at the either or both the at least one end user and the fluid control unit, respectively; or
      a recognizable sequence of flow pulsations through the fluid automatically generated by a verification signal generator in response to the initiation of the fluid flow through the fluid flow system;
   wherein the verification signal, being the recognizable acoustic signal, is generated responsive to a query signal generated by the fluid control unit.

2. The fluid flow system according to claim 1, wherein at the absence of the verification signal, the fluid control unit is configured for generating a shutoff signal to the flow valve to terminate the fluid flow to the end-user.

3. The fluid flow system according to claim 1, wherein a first one of the query signal and the verification signal is generated upon fluid consumption through the fluid flow system.

4. The fluid flow system according to claim 1, wherein the query signal is a recognizable acoustic signal over a piping of the fluid flow system.

5. The fluid flow system according to claim 1, wherein the query signal is a recognizable acoustic signal generated by a signal generator configured for generating a respective signal, and transmitting it, through a communication arrangement, to a receiver configured at the either or both the end-user and the fluid control unit, respectively.

6. The fluid flow system according to claim 1, the fluid control unit comprising a user interface for setting the fluid control unit at different operative positions.

7. A signaling method between a fluid control unit and an end-user, comprising the following steps:
   (a) providing a fluid flow system comprising a supply line coupleable to a main fluid supply line, a fluid control unit, a flow valve governed by the fluid control unit, and at least one end-user;
   (b) consuming fluid through the at least one end-user, with the flow valve at an open position thereof;
   (c) before or during step (b) generating a verification signal;
   (d) transferring said verification signal to the fluid control unit; and
   (e) certifying the verification signal by the fluid control unit and determining whether to maintain the flow valve open,
   wherein the verification signal is at least one of the following:
      a recognizable acoustic signal over a piping of the fluid flow system;
      a recognizable acoustic signal generated by a signal inducer configured for generating a respective signal, and transmitting the recognizable acoustic signal, through a communication arrangement, to a receiver configured at the either or both the at least one end user and the fluid control unit, respectively; or
      a recognizable sequence of flow pulsations through the fluid automatically generated by a verification signal generator in response to initiation of the fluid flow through the fluid flow system;
   wherein the verification signal, being the recognizable acoustic signal, is generated responsive to a query signal generated by the fluid control unit.

8. The signaling method according to claim 7, wherein at the absence of the verification signal, the fluid control unit is configured for generating one or more reminder query signals, whereby at an event of failure to generate a responsive verification signal, the fluid control unit will generate a control signal to close a flow valve associated with the respective non-responding end-user.

9. The fluid flow system of claim 1, wherein the verification signal generator is a flow-altering unit associated with a supply line or with the respective end-user, and is configured for temporarily altering fluid flow pattern through the line in compliance with a predetermined signal.

10. The fluid flow system according to claim 9, the verification signal generator comprising:
    a housing fitted with an inlet port and an outlet port and a fluid chamber disposed between said inlet port and outlet port;
    a flow regulator configured to facilitate fluid flow into the fluid chamber at a substantially constant flow rate; and
    a flow restriction device configured to facilitate flow through the verification signal generator only upon pressure buildup within the fluid chamber to a predetermined value.

11. The fluid flow system according to claim 10, wherein the flow regulator is replaceable to obtain different flow rates into the fluid chamber.

12. The fluid flow system according to claim 10, wherein the pressure threshold required to open the flow restriction device is controllable.

* * * * *